United States Patent [19]
Blatter

[11] Patent Number: 5,948,085
[45] Date of Patent: Sep. 7, 1999

[54] BUS VOLTAGE DETECTION AND PROTECTION

[75] Inventor: Harold Blatter, Indianapolis, Ind.

[73] Assignee: Thomson Consumer Electronics, Inc., Indianapolis, Ind.

[21] Appl. No.: 08/693,523

[22] Filed: Aug. 8, 1996

[51] Int. Cl.$^6$ .................................................. G06F 13/00
[52] U.S. Cl. ...................... 710/100; 327/143; 307/66; 340/333; 361/93; 372/38
[58] Field of Search ........................ 327/143; 340/333; 307/66; 395/280; 372/38; 361/93; 710/100

[56] References Cited

U.S. PATENT DOCUMENTS

| | | | |
|---|---|---|---|
| 4,016,458 | 4/1977 | Everhart | 361/52 |
| 4,075,504 | 2/1978 | Gnaedinger | 307/66 |
| 4,153,924 | 5/1979 | Moran | 361/94 |
| 4,296,450 | 10/1981 | Paice et al. | 361/50 |
| 4,347,602 | 8/1982 | Kister et al. | 370/85 |
| 4,455,534 | 6/1984 | Gillig | 330/51 |
| 4,609,982 | 9/1986 | Gohda | 369/89 |
| 4,704,599 | 11/1987 | Kimmel et al. | 340/333 |
| 4,835,737 | 5/1989 | Herrig et al. | 364/900 |
| 4,924,412 | 5/1990 | Leydier | 364/483 |
| 5,025,420 | 6/1991 | Kimura | 365/230.01 |
| 5,291,545 | 3/1994 | Stahl | 379/98 |
| 5,297,014 | 3/1994 | Saito et al. | 363/21 |
| 5,341,371 | 8/1994 | Simpson | 370/85.4 |
| 5,414,378 | 5/1995 | Edgar et al. | 327/143 |
| 5,428,633 | 6/1995 | Hiroshima | 372/38 |
| 5,485,488 | 1/1996 | Van Brunt et al. | 375/257 |
| 5,606,482 | 2/1997 | Witmer | 361/93 |
| 5,781,051 | 7/1998 | Sandhu | 32/143 |

FOREIGN PATENT DOCUMENTS

| | | |
|---|---|---|
| 570322 | 11/1993 | European Pat. Off. . |
| WO93/15459 | 8/1993 | WIPO . |

OTHER PUBLICATIONS

Copy of International Search Report.

*Primary Examiner*—Ayaz R. Sheikh
*Assistant Examiner*—Frantz Blanchard Jean
*Attorney, Agent, or Firm*—Joseph S. Tripoli; Joseph J. Laks; Francis A. Davenport

[57] ABSTRACT

A simplified serial data bus provides interconnection between equipment such as computers, imaging apparatus, and consumer electronic devices. The simplified bus utilizes the cable and connectors of a data bus standard. An apparatus for data communication comprises a connector for receiving a plurality of signal carrying conductors. A control circuit is coupled to the connector for supplying a control signal to one of the plurality of conductors. A detector is coupled to the connector for detecting a voltage source on the one of the plurality of conductors. The control signal is inhibited responsive to detection of the voltage source.

20 Claims, 2 Drawing Sheets

5,948,085

BUS VOLTAGE DETECTION AND PROTECTION

This invention relates to the field of data communication by bus connection and in particular to the protection of equipment coupled to the bus.

BACKGROUND OF THE INVENTION

A requirement exists to provide a simple, low cost means for interconnecting equipment such as computers, imaging apparatus, and consumer electronic devices. A serial data bus configuration has been standarded by the IEEE and is designated as 1394–1995. The 1394 standard multiplexes a variety of compressed digital audio and video signals, MIDI and device control commands onto two twisted pair conductors and provides for connections to 63 peripheral nodes with data transmission rates of up to 400 Mbps. Devices are interconnected in a daisy chain manner by a small, thin, flexible cable comprising three twisted pairs, terminated with standardized, rugged connectors capable of multiple insertions. The three twisted pairs are assigned as follows, a first conductor pair provides data transmission/reception, a second conductor pair are used for data strobe signaling. The third conductor pair provides one conductor as a power supply ground with the second conductor providing an optional coupling for power insertion or extraction.

Data transmission and reception is facilitated utilizing the well known data coding method known as non-return to zero, or NRZ. Data transmission is accompanied by a strobe signal which changes state whenever two consecutive NRZ data bits are the same. Thus the data and strobe signals may be processed by an exclusive OR function to form a clock signal which marks transitions in either data or strobe signals. This method of data and strobe signal coding is described in U.S. Pat. No. 5,341,371.

The third conductor pair of the IEEE 1394 standard provides an optional power capability. This powering option may be ignored, utilized to supply an unregulated DC source to the bus, or may provide power to energize a bus node. The unregulated power supply voltage may have a value between 8 and 40 volts and is required to supply a maximum of one ampere per connected node without the supply voltage falling below 8 volts.

In a simplified digital data communication system, for example an audio video interface system, data transmission and reception may be facilitated by the method employed in the 1394 data bus standard. However, simplification of the interface system may be achieved if only a single data source is permitted to occupy any one data bus segment. This simplification eliminates the need for much of the digital circuit complexity associated with a link layer required by the standard, and analog signaling associated with a physical layer of the standard. In such a simplified system, control could be achieved by means of a single conductor, wired-OR control bus. In addition a simplified interface system may beneficially utilize the standardized cable and connectors. However, such use of the standardized cable and connectors as a simplified bus could permit an undesirable connection between the simplified bus apparatus and equipment conforming to the standard. Thus, beneficial utilization of the standardized cable and connectors by the simplified system described above is precluded by the risk of consequential circuitry damage resulting from such non-compliant use, inconsistent with the standard.

SUMMARY OF THE INVENTION

The prohibited use of the standardized cable and connectors by a non-standard compliance system is overcome by apparatus and methods employing inventive arrangements. In an embodiment incorporating an inventive arrangement an apparatus for data communication comprises: a connector for receiving a plurality of signal carrying conductors; a control circuit coupled to the connector for supplying a control signal to one of the plurality of conductors; and a detector coupled to the connector for detecting a power source on the one of the plurality of conductors and inhibiting the control signal responsive to detection of the power source. In another embodiment incorporating an inventive arrangement an apparatus for digital audio and video communication comprises: a connector for receiving a plurality of signal carrying conductors in accordance with an industry standard; a control circuit coupled to the connector for supplying a control signal to one of the plurality of conductors inconsistent with the industry standard; and, a safety circuit coupled to the connector for protecting the control circuit from a power source coupled to the one of the plurality of conductors consistent with the industry standard. In yet another embodiment incorporating an inventive arrangement, a method for protecting an apparatus coupled to a plurality of conductors for data communication comprises the steps of: receiving the plurality of signal carrying conductors in a connector; coupling a control circuit to the connector for supplying a control signal to one of the plurality of conductors; monitoring the one of the plurality of conductors for the presence of a power source; and, interrupting the supplying of the control signal responsive to detection of the power source.

DETAILED DESCRIPTION

Figure 1:
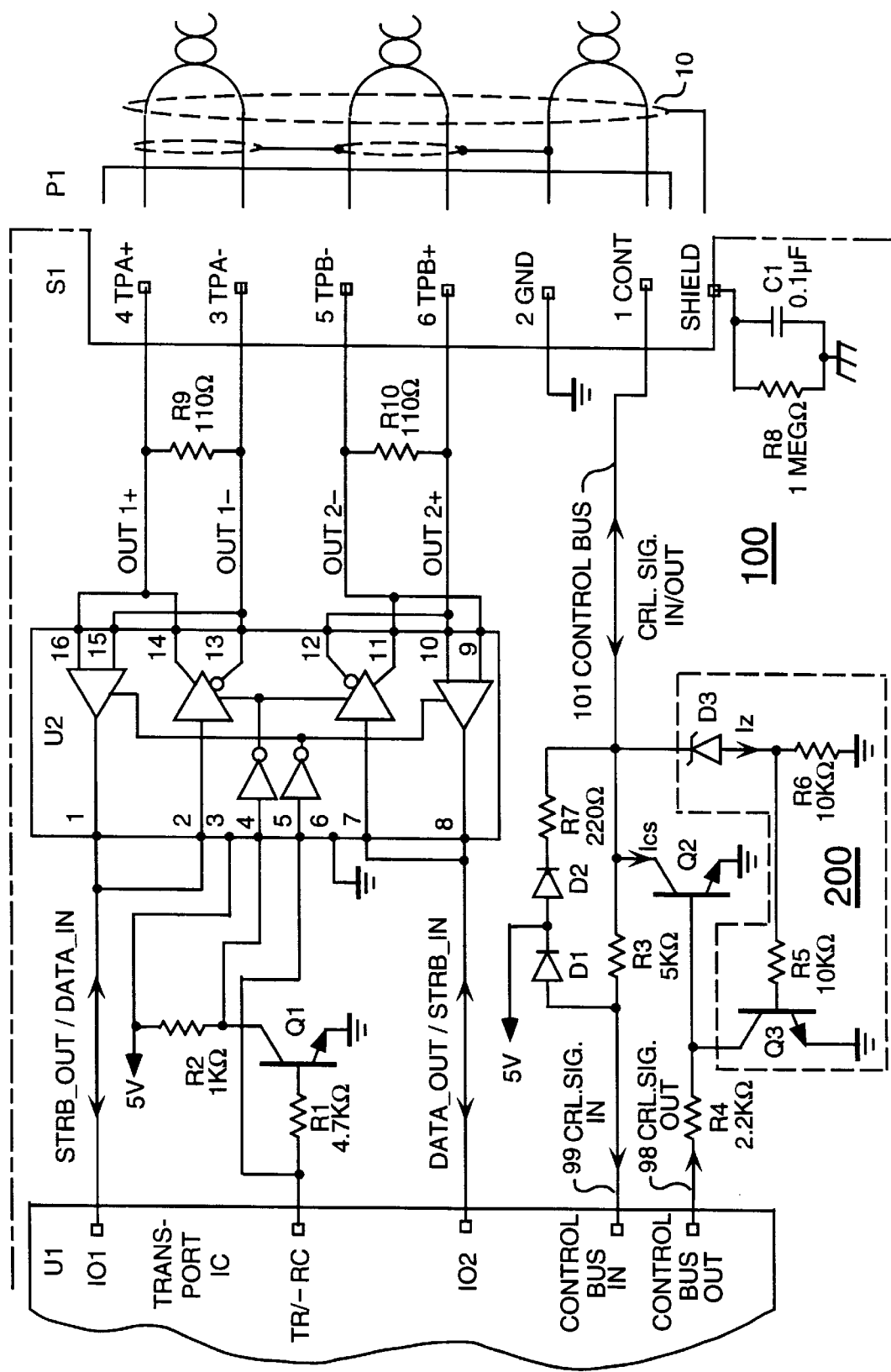
FIG. 1 illustrates a simplified digital audio/video apparatus including an inventive embodiment coupled to a data bus.

In FIG. 1 a simplified digital audio/video interface is illustrated for coupling between an exemplary consumer electronic apparatus 100 and a data bus 10. Consumer electronic apparatus 100 represents a number of different devices including, for example, a digital television receiver, a digital video disk player or digital image authoring device. The partial consumer apparatus 100 shown in FIG. 1 comprises a transport integrated circuit U1, a data bus transceiver U2 and a standardized data bus mating connector S1. The data bus mating connector S1 complies with the standardized connector and provides coupling with the 1394 data bus connector P1 and cable 10. Integrated circuit U1, illustrated partially in FIG. 1, provides a number of functions in addition to those illustrated, however only functions which are illustrated will be described in detail. Transport integrated circuit U1 accepts an MPEG encoded audio and video data stream, derived as appropriate to the consumer apparatus type. The MPEG encoded audio and video data stream is formatted within integrated circuit U1 for transmission by non-return to zero, or NRZ coding. The NRZ coded data stream is output from integrated circuit U1 at input/output 2, designated in FIG. 1 as I02, and is connected to a data bus transmitter/receiver integrated circuit U2 at pins 7 and 8. Integrated circuit U2 provides two pairs of line drivers and line receivers which are controlled to transmit or receive responsive to a transmit receive signal TR/−RC, generated by transport integrated circuit U1. The transmit receive signal is connected directly to pin 5 of integrated circuit U2, and is also coupled via a resistor R1 to the base terminal of an inverting amplifier transistor Q1. The inverted TR/–RC signal at the collector of transistor Q1 is connected to pin 4 of integrated circuit U2. Concurrent with the generation of NRZ transmission code, integrated circuit U1 generates a strobe signal in accordance with the previously described data strobe bit level encoding method. The strobe signal is output from integrated circuit U1 at input/output 1, designated I01, and is connected the data bus transmitter/receiver integrated circuit U2 pins 1 and 2.

The line driver and receiver of each pair are coupled together to form output signals OUT1+, OUT1– and OUT2+, OUT2– respectively. These output signals are terminated by resistors R9 and R10 and are connected at connector S1 to pin 4 (TPA+), pin 3 (TPA–) and pin 6, (TPB+), pin 5(TPB–) respectively. The placement of these output signals on connector S1 is shown in Table 1, together with the signal assignment of standard 1394–1995.

TABLE 1

CONNECTOR PIN ASSIGNMENT

| PIN No. | IEEE 1394–1995 STD. | SIMPLE DAV BUS |
|---|---|---|
| 1 | POWER (OPTIONAL) | CONTROL DATA |
| 2 | POWER GROUND | POWER GROUND |
| 3 | TPB – | TPA – (OUT1–) |
| 4 | TPB + | TPA + (OUT1+) |
| 5 | TPA – | TPB – (OUT2–) |
| 6 | TPA + | TPB + (OUT2+) |

Nodes connected to data bus 10 may originate data and strobe signals which are coupled via connectors S1/P1 to the line receivers of integrated circuit U2. These data and strobe signals may be generated in response to a control command signal 98, originated by transport integrated circuit U1, or may result from user operation of the bus node which is signaled to transport integrated circuit U1 by control signal 99. However, transport integrated circuit U1 generates a receive command –RC which is coupled to the line receivers to enable reception of the remote data and strobe signals.

Control command signal 98, CRL. SIG. OUT, is generated by transport integrated circuit U1 and coupled via a resistor R4 to the base terminal of transistor Q2. The emitter terminal of transistor Q2 is connected to signal ground and the collector terminal is connected to a series combination of load resistor R7 and diode D2. The anode of diode D2 is connected to a +5 volt supply. The junction of resistor R7 and the collector of transistor Q2 is connected via control bus 101 to pin 1 of connector S1. A positive control signal 98, is coupled to the base terminal of transistor Q2 causing the transistor to saturate and effectively connect the collector to signal ground at the emitter. With transistor Q2 saturated, a current Ics is drawn from the +5 volt supply via diode D2 and resistor R7, and from +5 volt supplies of other nodes connected to the bus. The resulting current flow causes the control bus 101 and pin 1 of connector S1 to assume a voltage equal to the collector emitter saturation voltage of transistor Q2, nominally signal ground. Transistor Q2 is selected for power dissipation, low saturation voltage, good current gain and switching speed. In the event that connection is made between the simplified interface and a1394 standard compliant device, transistor Q2 is required to sustain a collector emitter DC voltage of at least 40 volts. Under such interconnection diode D2 prevents voltages in excess of nominally +5.7 volts from coupling to the +5 volt supply. In addition diode D2 is required to sustain a reverse breakdown voltage in excess of 40 volts. To prevent grounding loop currents the screen of bus cable 10 is connected to the apparatus chassis via a parallel connected combination of resistor R8 and capacitor C1.

Transport integrated circuit U1 receives control command signal 99, CRL. SIG. IN, via a resistor R3 which is connected to control bus 101 and pin 1 of connector S1. During erroneous interconnection with a standard compliant system, control bus 101 may assume DC voltages of up to 40 volts. Thus, to protect the transport integrated circuit from damage resulting from excessive bus voltage, a protection diode D1 is connected between the +5 volt supply and the junction of resistor R3 and integrated circuit U1 control bus input. When the bus voltage is greater than nominally +5.7 volts diode D1 conducts and diverts current into the +5 volt supply. Resistor R3 and diode D1 limit current conduction to less than 10 milliamperes. Control command signal 99, may result from the switching action of transistor Q2 or from a similar current sinking switch located at a bus node. Typically when a control command signal 98 is generated by the transport integrated circuit, it is immediately received at the control bus input via resistor R1. Control logic within the transport integrated circuit then waits for a control acknowledgment from the remote node addressed. However, the absence of the out going control command, coupled via resistor R1, is utilized by the transport integrated circuit to signal detection of an improper bus connection and shut down generation of out going data and strobe signals. Following detection of an improper bus connection the transport integrated circuit periodically polls and waits for any acknowledgment indicative of restoration of the simplified bus connection.

Control signals in and out of apparatus 100 are coupled via bus 101 and pin 1 of connectors S1 and P1. However, the standard 1394 shown in Table 1 assigns pin 1 to be a power supply connection. Since control signaling is achieved by effectively grounding pin 1 of connectors S1/P1, equipment damage may result from connection between the simplified interface discussed herewith and a standard compliant device. Thus, to avoid possible equipment damage, an inventive safety circuit 200 is employed. Safety circuit 200 provides detection and protection by sensing the presence of a power supply potential on control bus 101, and in response, inhibiting coupling of control signals to the bus. Circuit 200 comprises a voltage detector, diode D3, which senses a DC potential presence on control bus 101. Diode D3 is connected to a transistor switch Q3 which effectively grounds the base terminal of transistor Q2 and prevents control signal coupling to control bus 101. The 1394 proposal provides for an unregulated DC power supply having a voltage of between 8 and 40 volts, thus voltage detection diode D3 is selected to have a breakdown voltage of approximately 7.5 volts. The cathode of zener diode D3 is connected to control bus 101 and pin 1 of connectors S1/P1. The anode of diode D3 is connected to the junction of two resistors R5 and R6. Resistor R6 is connected to ground, and resistor R5 is connected to a base terminal of transistor Q3. The emitter of transistor Q3 is connected to ground and the collector is connected to the junction of resistor R4 and the base of transistor Q2.

Operation of circuit 200 is as follows. Typically, with simplified bus operation, connector S1 pin 1 has a voltage of either nominally ground or +5 volts. Zener diode D3 detects an excess bus voltage condition, resulting for example from connection to a 1394 bus. The excess bus voltage results in the breakdown voltage of diode D3 being exceeded. When diode D3 conducts, a current Iz flows to ground via resistor R6 and in addition causes transistor Q3 to turn on and saturate. Saturating transistor Q3 results in the base of transistor Q2 being held at the collector potential, Vcesat, of transistor Q3. Thus, control signal 98 is attenuated by the potential divider formed by resistor R4 and the saturated conduction of transistor Q3. In addition the collector of transistor Q3 clamps the base of transistor Q2 to the collector potential, Vcesat of transistor Q3. Thus transistor Q2 is held off, coupling of the control signal to bus 101 is inhibited and possible damage to device 100 and the 1394 bus compliant node is prevented. In addition, since transistor Q2 is held off, output control commands are prevented from coupling or being echoed to the control bus input. Thus detection of a bus power source is signaled to the transport integrated circuit by the absence of the control echo.

Figure 2:
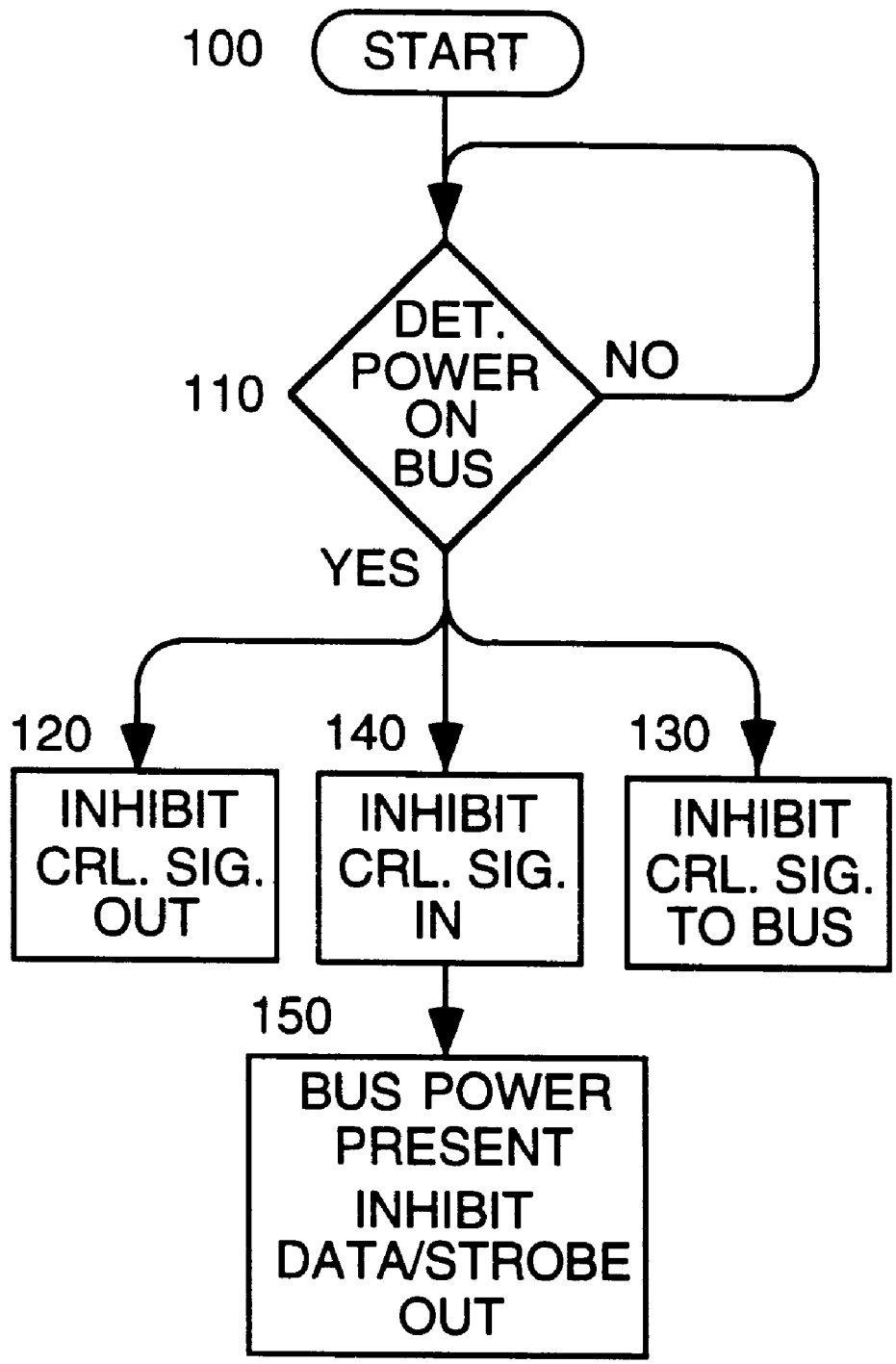
FIG. 2 is a simplified illustration of an inventive series of steps.

FIG. 2 is a chart showing, in simplified form, operation of safety circuit 200. Operation circuit 200 commences at element 100, START. The presence of a power source on the bus is detected at element 110. Observation of FIG. 1 shows that circuit 200 is coupled directly to bus 101, and connectors S1 and P1, hence circuit 200 continuously monitors for the presence of power. A NO at element 110 forms a loop which continues to monitor for bus power. Hence safety circuit 200 is quiescent, and control signals 98, 99 are coupled to and from control bus 101 and connectors S1 and P1. A YES at element 110 is coupled to control three circuit functions. The YES the inhibits coupling of control signal 98, at element 120. Control signal 98 is inhibited by the active attenuator formed by saturated transistor Q3. The YES at element 110 also inhibits, at element 130, the coupling of control signal 98 to bus 101 and connectors S1 and P1 by preventing conduction in control signal transmission transistor Q2. At element 140, the YES from element 110 also inhibits coupling of control signal 99 into transport integrated circuit U1. Thus by inhibiting control signal 99, element 150 signals the presence of bus power to integrated circuit U1 causing the generation and output of data and strobe signals to cease. In addition, the transport integrated circuit enters a waiting condition with periodic polling by control signal 98 and monitoring of control signal 99 for a reply.

The beneficial, but prohibited, use of standardized cable and connectors by a nonstandard-compliant apparatus is overcome by inventive apparatus and methods. Apparatus and methods are disclosed employing various inventive arrangements, exemplified by: a detector for identifying a power source and inhibiting the control signal; a safety circuit coupled to protect the control circuit from a standard compliant power source; and, the monitoring of a conductor for the presence of a power source, and responsive thereto, interrupting the supplying of the control signal.

What is claimed is:

1. An apparatus for data communication, comprising:
   a connector for receiving a plurality of conductors, one of said conductors being designated for carrying a potentially damaging signal type in a first mode of operation;
   a control circuit coupled to said connector for supplying a control signal to said one of said plurality of conductors in a second mode of operation; and,
   a detector coupled to said connector for detecting said potentially damaging signal type on said one of said plurality of conductors and inhibiting said second mode of operation responsive to detection of said potentially damaging signal type.

2. The apparatus for data communication of claim 1, wherein said detector has a voltage threshold detection value of at least approximately 7 volts.

3. The apparatus for data communication of claim 1, wherein said connector is in conformance with a predetermined signal designation, said presence of said potentially damaging signal being consistent with said predetermined signal designation and said supplying of said control signal being inconsistent with said predetermined signal designation.

4. The apparatus for data communication of claim 1, wherein said connector receives up to 6 conductors which are assigned receptacles numbered 1 through 6.

5. The apparatus for data communication of claim 4, wherein said one of said plurality of conductors is coupled to receptacle number 1.

6. The apparatus for data communication of claim 1, wherein said detector comprises a voltage sensing device.

7. The apparatus for data communication of claim 6, wherein said power sensing device senses a DC voltage of at least approximately 7 volts.

8. The apparatus for data communication of claim 6, wherein said power sensing device comprises a zener diode.

9. The apparatus for data communication of claim 1, wherein said coupling of said control signal with said one of said plurality of conductors is inhibited responsive to detection of said potentially damaging signal.

10. The apparatus for data communication of claim 1, wherein said detector comprises a switch for decoupling an output of said control circuit responsive to detection of said potentially damaging signal.

11. The apparatus for data communication of claim 10, wherein said switch decouples an input control signal to said control circuit responsive to detection of said potentially damaging signal.

12. An apparatus for digital audio and video communication, comprising:
   a control circuit;
   a connector coupled to said control circuit and receiving a plurality of conductors, said plurality of conductors having a set of designated signals, one of said plurality of conductors having a designated signal potentially damaging to said control circuit in a first mode of operation but not in a second mode of operation;
   said control circuit safely receiving said potentially damaging signal from said one of said conductors in said second mode of operation and supplying a control signal to said one of said conductors in said first mode of operation, said supplying of said control signal to said one of said plurality of conductors being inconsistent with said set of designated signals; and,
   a safety circuit coupled to said connector for protecting said control circuit from said potentially damaging signal in said first mode of operation.

13. The apparatus of claim 12, wherein said safety circuit monitors said one of said plurality of conductors for a presence of a power source and interrupts said supplying of said control signal responsive to detection of said power source.

14. The apparatus of claim 13, wherein said safety circuit interrupts said supplying of said control signal by decoupling said control signal from said one of said plurality of conductors.

15. The apparatus of claim 14, wherein said safety circuit interrupts said coupling between said one of said plurality of conductors and an input terminal of said control circuit.

16. A method for protecting an apparatus in which a control circuit is coupled to a plurality of signal carrying conductors for data communications, said method comprising the steps of:
   receiving said plurality of signal carrying conductors in a connector, one of said conductors carrying a supply potential in a normal mode of operation;

coupling a control circuit to said connector;

monitoring said one of said plurality of conductors for said source of supply potential;

supplying a control signal from said control circuit to said one of said plurality of conductors, in a mode of operation different than said normal mode of operation, when said supply potential is not detected by said monitoring step; and, interrupting said supplying of said control signal responsive to detection of said supply potential by said monitoring step, thereby protecting said control circuit from said supply potential.

17. The method of claim 16, comprising the step of interrupting said supplying of said control signal by decoupling said control signal from said one of said plurality of conductors.

18. The method of claim 16, comprising the step of interrupting said supplying of said control signal by inhibiting generation of said control signal.

19. The method of claim 16, comprising the step of interrupting said supplying of said control signal between an output terminal of said control circuit and said one of said plurality of conductors.

20. The method of claim 16, comprising the step of interrupting said supplying of said control signal between said one of said plurality of conductors and an input terminal of said control circuit.

* * * * *